US011271847B2

(12) United States Patent
Tsukishima et al.

(10) Patent No.: US 11,271,847 B2
(45) Date of Patent: Mar. 8, 2022

(54) MULTIPOINT DISTRIBUTION SYSTEM, DISTRIBUTION METHOD, MANAGEMENT DEVICE AND PROGRAM

(71) Applicant: NIPPON TELEGRAPH AND TELEPHONE CORPORATION, Tokyo (JP)

(72) Inventors: Yukio Tsukishima, Musashino (JP); Hitoshi Masutani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/252,336

(22) PCT Filed: Jun. 18, 2019

(86) PCT No.: PCT/JP2019/024048
§ 371 (c)(1),
(2) Date: Dec. 15, 2020

(87) PCT Pub. No.: WO2020/004133
PCT Pub. Date: Jan. 2, 2020

(65) Prior Publication Data
US 2021/0266249 A1    Aug. 26, 2021

(30) Foreign Application Priority Data
Jun. 25, 2018    (JP) .............................. JP2018-120237

(51) Int. Cl.
*H04L 12/761* (2013.01)
*H04L 12/707* (2013.01)
(Continued)

(52) U.S. Cl.
CPC .............. *H04L 45/16* (2013.01); *H04L 45/22* (2013.01); *H04L 45/42* (2013.01)

(58) Field of Classification Search
CPC ......... H04L 45/16; H04L 45/42; H04L 45/22; H04L 12/18; G06F 13/00
See application file for complete search history.

(56) References Cited

U.S. PATENT DOCUMENTS 6,324,570 B1 * 11/2001 Tonchev ................. H04L 47/10
709/207
6,363,319 B1 * 3/2002 Hsu ......................... H04L 45/00
701/533

(Continued)

FOREIGN PATENT DOCUMENTS

JP    2017153042 A    8/2017

OTHER PUBLICATIONS

Yuka Kato et al., A Proposal of User-oriented QoS Control Methods for Video Transport Services in IP Networks, Information Processing Society of Japan, vol. 44, No. 3, 2003, pp. 561-569.

*Primary Examiner* — Patrice L Winder

(57) ABSTRACT

An object is to provide a multipoint distribution system, a distribution method, a management apparatus, and a program which determine whether or not to switch between a current-use system and a backup system in consideration of the importance levels of distribution destinations. The multipoint distribution system according to the present invention includes a distribution destination system importance level database that stores the importance levels of distribution destinations. When a distribution destination not able to communicate with a current-use video distribution system is detected, the multipoint distribution system performs switching from the current-use video distribution system to a backup video distribution system only upon determining that the distribution destination is important by referring to the distribution destination system importance level database.

4 Claims, 6 Drawing Sheets

(51) Int. Cl.
*H04L 12/717* (2013.01)
*H04L 45/16* (2022.01)
*H04L 45/00* (2022.01)
*H04L 45/42* (2022.01)

(56) References Cited

U.S. PATENT DOCUMENTS

| | | | | |
|---|---|---|---|---|
| 7,908,393 | B2* | 3/2011 | Marr | H04L 47/50 |
| | | | | 709/232 |
| 8,331,235 | B2* | 12/2012 | Gottwerth | H04L 12/56 |
| | | | | 370/235 |
| 9,825,807 | B2* | 11/2017 | Tracy | H04L 45/16 |
| 9,918,322 | B2* | 3/2018 | Sharma | H04W 72/10 |
| 2008/0263130 | A1* | 10/2008 | Michalowitz | H04L 12/1859 |
| | | | | 709/202 |
| 2016/0234234 | A1* | 8/2016 | McGrew | H04L 63/1425 |

* cited by examiner

[7]

| DISTRIBUTION DESTINATION SYSTEM NAME | IMPORTANCE LEVEL |
|---|---|
| DISTRIBUTION DESTINATION SYSTEM 1 | IMPORTANT |
| DISTRIBUTION DESTINATION SYSTEM 2 | UNIMPORTANT |
| DISTRIBUTION DESTINATION SYSTEM 3 | IMPORTANT |
| DISTRIBUTION DESTINATION SYSTEM 4 | IMPORTANT |
| DISTRIBUTION DESTINATION SYSTEM 5 | UNIMPORTANT |
| ... | ... |

MULTIPOINT DISTRIBUTION SYSTEM, DISTRIBUTION METHOD, MANAGEMENT DEVICE AND PROGRAM

CROSS-REFERENCE TO RELATED APPLICATIONS

This application is a 371 U.S. National Phase of International Application No. PCT/JP2019/024048, filed on Jun. 18, 2019, which claims priority to Japanese Application No. 2018-120237 filed on Jun. 25, 2018. The entire disclosures of the above applications are incorporated herein by reference.

TECHNICAL FIELD

The present disclosure relates to a video distribution system having a redundant configuration.

BACKGROUND ART

To achieve live distribution of concerts and sports, it is necessary to transmit video from one distribution source to many distribution destinations while making an encoder economical. Examples are widely seen where IP multicast (MC) is performed on the same VPN using an IP-VPN on which it is easy to guarantee communication quality to realize such live distribution.

However, from the viewpoint of telecommunications carriers, MC increases system processing load and it is difficult to predict the demand for MC. Thus, it is common for additional charges to be incurred when MC is used. Further economization can be expected if the same operation as MC can be achieved using only unicast (UC) in the VPN.

On the other hand, realization of high processing performance with which full HD class live video (4810 pps) can be distributed to, for example, 48 prefectures, has also been required in recent years. A conventional unicast technology cannot satisfy such performance requirements.

To transfer one packet to multiple sites, protocol implementations such as those of an IP multicast protocol and unicast copies have been made and applied because network devices are implemented conventionally in hardware from the viewpoint of performance and thus it is difficult to flexibly duplicate packets or rewrite header information.

However, there are some problems in introducing such an IP multicast protocol and unicast copies. For example, when the IP multicast protocol is used, all network devices need to be compatible with the IP multicast protocol, and unicast copies involve special labor for terminal installation and performance-related issues.

To address such problems, there has been proposed a technology that ensures that a packet transmitted from a transmission source can be transferred to a plurality of sites without performing special setting or the like on existing devices (for example, see Patent Literature 1). The technology described in Patent Literature 1 will be briefly described below.

System Configuration

FIG. 1 shows an overall configuration of a communication system of Patent Literature 1. The communication system has a configuration in which a software defined networking (SDN) switch 100 is arranged and a video encoder 300 and a plurality of decoders 400 are connected to the SDN switch 100 via a network as illustrated in FIG. 1. In the example of FIG. 1, a layer 3 switch (L3SW) 500 is also connected to the SDN switch 100. In the example of FIG. 1, an IP segment is divided into an input-side segment and an output-side segment.

The SDN switch 100 includes a flow table (which may also be referred to as a flow rule) having a match field (matching part) and an action field (action part). The SDN switch 100 compares information such as a header of an input packet with information described in the match field and performs an operation described in the action field (for example, an operation of rewriting the header and outputting the packet through a predetermined port) when they match. The SDN switch 100 may also be referred to as a packet transfer device.

Further, a switch control apparatus 200 is provided as illustrated in FIG. 1. The switch control apparatus 200 performs address resolution protocol (ARP) execution control, setting of the flow table, and the like for the SDN switch 100. The switch control apparatus 200 may also be referred to as a packet transfer control apparatus. Also, the encoder 300 may be referred to as a packet transmission device and the decoders 400 may be referred to as packet reception devices.

In the communication system, the SDN switch 100 receives a packet (encoded data) transmitted from the transmission side and transmits the packet to a plurality of reception sides through unicast copies.

In this communication system, the SDN switch 100 rewrites a destination IP address and a destination MAC address of a packet to be output according to the destination of the packet as described above because the output side transmits the packet by unicast. This destination MAC address is that which the SDN switch 100 (or the switch control apparatus 200) has obtained by executing ARP inquiry with the destination IP address designated.

Device Configuration

FIG. 2 is a configuration diagram of the SDN switch 100 of Patent Literature 1. The SDN switch 100 includes a packet receiver 101, a packet matching processor 102, an address translator 103, a packet transmitter 104, a flow table holder 105, and a switch controller 106 as illustrated in FIG. 2.

The switch controller 106 performs setting of a flow table in the flow table holder 105 (for example, adds, replaces, deletes, and corrects flow entries) on the basis of an instruction from the switch control apparatus 200. When the packet receiver 101 receives a packet, the packet matching processor 102 compares information of the packet (for example, destination/source addresses and destination/source port numbers) with the matching part of the flow table. If there is a matching entry, the packet matching processor 102 duplicates packets.

Then, the address translator 103 translates the address of each packet in accordance with content of the action part of the flow table and the packet transmitter 104 sends each packet through a designated port.

Further, the packet receiver 101 and the packet transmitter 104 include, for example, functions of receiving an ARP query and issuing an ARP response and functions of transmitting an ARP query and receiving an ARP response. For example, to determine MAC addresses of video distribution destinations, the switch control apparatus 200 sends an ARP execution instruction together with a list of destination IP addresses to the switch controller 106 of the SDN switch 100 and the switch controller 106 instructs the packet transmitter 104 and the packet receiver 101 to execute ARP inquiry for each destination IP address in the list. For example, upon acquiring MAC addresses corresponding to the destination IP addresses, the packet receiver 101 notifies the switch controller 106 of the MAC addresses and the switch controller 106 transmits the MAC addresses to the switch control apparatus 200.

FIG. 3 is a configuration diagram of the switch control apparatus 200 of Patent Literature 1. The switch control apparatus 200 includes a distribution source/destination list registration unit 201, a data storage unit 202, an ARP controller 203, a flow table generator 204, and a flow table setting unit 205 as illustrated in FIG. 3.

The distribution source/destination list registration unit 201 receives a list of distribution source and destination IP addresses from a terminal of an operator and stores the list in the data storage unit 202. The data storage unit 202 stores various data.

The ARP controller 203 stores, in the data storage unit 202, MAC addresses for the destination IP addresses obtained through an ARP execution instruction issued to the SDN switch 100 and an ARP response therefrom. The flow table generator 204 generates a flow table using the distribution source/destination list and the MAC addresses acquired by the ARP controller 203. The flow table setting unit 205 transmits (sets) the flow table generated by the flow table generator 204 to the SDN switch 100.

About Operation Procedure

Next, an exemplary operation procedure of this communication system will be described with reference to a procedure shown in the flowchart of FIG. 4.

First, in step S101, the operator or the like inputs a list of the IP address of an encoder that is a video distribution source and the IP addresses of a plurality of decoders that are distribution destinations to the distribution source/destination list registration unit 201 of the switch control apparatus 200 and then the distribution source/destination list registration unit 201 stores the list in the data storage unit 202.

Next, in step S102, the ARP controller 203 transmits the list of IP addresses of the distribution destinations to the SDN switch 100 to cause the SDN switch 100 to execute ARP inquiry with the IP addresses of the distribution destinations designated. The SDN switch 100 acquires MAC addresses of decoders that are the distribution destinations and returns the MAC addresses to the ARP controller 203 of the switch control apparatus 200. The ARP controller 203 stores the MAC addresses in the data storage unit 202 in association with the destination IP addresses.

To refer to a source MAC address during a matching process at the time of rewriting the destination address of the packet, the ARP controller 203 may acquire the source MAC address by designating the IP address of the distribution source and issuing an ARP instruction to the SDN switch 100.

In the above example, the switch control apparatus 200 issues an ARP execution instruction to the SDN switch 100 and the SDN switch 100 executes ARP. However, instead of this, the switch control apparatus 200 itself may execute ARP for the distribution source encoder/distribution destination decoders.

Next, in step S103, the flow table generator 204 of the switch control apparatus 200 generates a flow table using the list of distribution source/destination IP addresses stored in the data storage unit 202 and the MAC addresses acquired in step S102.

In step S104 of FIG. 4, the flow table setting unit 205 transmits the flow table generated in step S103 to the SDN switch 100. The switch controller 106 of the SDN switch 100 receives and stores the flow table in the flow table holder 105.

In step S105, a packet transfer process referring to the flow table is started. That is, upon receiving a packet transmitted from the encoder 300, the SDN switch 100 makes the same number of copies of the packet as the number of distribution destinations and rewrites the destination address of each packet as described in each entry of the flow table and outputs each packet through a designated output port.

If the technology of Patent Literature 1 is used, the problems of the conventional multicast technology and the conventional unicast copy technology can be solved using the flexible packet control functions based on the SDN technique as described above, thus realizing multipoint distribution that achieves both economic efficiency and high processing performance.

CITATION LIST

Patent Literature

Patent Literature 1: JP 2017-153042A

Non Patent Literature

Non Patent Literature 1: Yuka Kato et al., "A Proposal of User-oriented QoS Control Methods for Video Transport Services in IP Networks," Journal of Information Processing Society of Japan, Vol. 44, No. 3, pp. 561-569 (2003)

SUMMARY OF THE INVENTION

Technical Problem

FIG. 5 is a diagram illustrating a flow copy cast system which is a specific example of the communication system of Patent Literature 1. A part in FIG. 5 illustrated as a video distribution system corresponds to the SDN switch 100 described with reference to FIGS. 1 to 4 and a part of FIG. 5 illustrated as a flow copy cast core corresponds to the switch control apparatus 200 described with reference to FIGS. 1 to 4. The flow copy cast system (video distribution system) receives a UDP video data packet sent by unicast from a video encoder side (distribution source system) and duplicates packets toward a designated video decoder group (group of distribution destination systems), changes their destination IP/MAC addresses, and sends them. This allows the flow copy cast system to perform operations like those of multicast communication even though they are of unicast communication.

This flow copy cast system is provided with a backup video distribution system in addition to a current-use video distribution system for redundancy. Upon detecting that the video distribution system that currently distributes video cannot distribute video to a distribution destination, the flow copy cast system determines that the current-use system has failed and switches to the backup video distribution system. This allows the system to continue video distribution without interruption.

In this way, the current communication system that provides multipoint video distribution services handles all distribution destinations uniformly and determines that there is a system failure based only on the fact that a video stream is not sent to a distribution destination and performs switching from the current-use system to the backup system. In reality, however, some distribution destinations are important, while others are not. Thus, interruption of distribution to an unimportant distribution destination alone causes switching between current-use and backup systems, resulting in temporary cutoff of distribution of video to an important distribution destination.

Consider, for example, a communication system that distributes a live video of a concert held in Tokyo nationwide. It is assumed that this video is distributed to important distribution destinations such as Osaka, Nagoya, Kyoto, Kobe, Hakata, Sapporo, Sendai, and Hiroshima, as well as to unimportant distribution destinations such as Shizuoka and Yamanashi. When video can be received in Osaka and Nagoya but cannot be received in Shizuoka and Yamanashi, this communication system determines that the current-use video distribution system has failed and performs switching from the current-use system to the backup system. Switching from the current-use system to the backup system allows video to be received in Shizuoka and Yamanashi but causes communication interruption in Osaka and Nagoya which are important distribution destinations at the timing of switching. The effects of interruption are serious because the video being distributed is a live video of the concert.

On the other hand, when video can be received in Shizuoka and Yamanashi but cannot be received in Osaka and Nagoya, this communication system also determines that the current-use video distribution system has failed and performs switching from the current-use system to the backup system. Switching from the current-use system to the backup system may interrupt reception in Shizuoka and Yamanashi which are unimportant distribution destinations, but restores video distribution in Osaka and Nagoya, thus avoiding the serious effect of suspension of video distribution to important distribution destinations.

The communication system of the related art switches between the current-use system and the backup system based only on whether or not distribution is possible, regardless of the importance of distribution destinations, causing a problem that video distribution to an important distribution destination is temporarily interrupted as described above. Thus, to solve the above problems, it is an object of the present invention to provide a multipoint distribution system, a distribution method, a management apparatus, and a program which determine whether or not to switch between a current-use system and a backup system in consideration of the importance levels of distribution destinations.

Means for Solving the Problem

In order to achieve the above object, the multipoint distribution system according to the present invention includes a distribution destination system importance level database that stores the importance levels of distribution destinations. When a distribution destination not able to communicate with a current-use video distribution system is detected, the multipoint distribution system performs switching from the current-use video distribution system to a backup video distribution system only upon determining that the distribution destination is important by referring to the distribution destination system importance level database.

Specifically, a multipoint distribution system according to the present invention includes a plurality of distribution systems and a management apparatus configured to control switching between the plurality of distribution systems to distribute content, wherein the management apparatus includes an importance level database configured to store importance levels of distribution destinations of content and checks an importance of a distribution destination not able to communicate with one of the plurality of distribution systems that currently distributes content by referring to the importance level database upon detecting the distribution destination not able to communicate with the one of the plurality of distribution systems and performs switching between the plurality of distribution systems if the distribution destination not able to communicate with the one of the plurality of distribution systems is important.

A distribution method according to the present invention is a distribution method for a multipoint distribution system including a plurality of distribution systems and a management apparatus configured to control switching between the plurality of distribution systems to distribute content, the management apparatus including an importance level database configured to store importance levels of distribution destinations of content, the distribution method including checking, by the management apparatus, an importance of a distribution destination not able to communicate with one of the plurality of distribution systems that currently distributes content by referring to the importance level database upon detecting the distribution destination not able to communicate with the one of the plurality of distribution systems and performing, by the management apparatus, switching between the plurality of distribution systems if the distribution destination not able to communicate with the one of the plurality of distribution systems is important.

A management apparatus according to the present invention is a management apparatus for controlling switching between a plurality of distribution systems to distribute content in a multipoint distribution system including the plurality of distribution systems, the management apparatus including an importance level database configured to store importance levels of distribution destinations of content, wherein the management apparatus checks an importance of a distribution destination not able to communicate with one of the plurality of distribution systems that currently distributes content by referring to the importance level database upon detecting the distribution destination not able to communicate with the one of the plurality of distribution systems and performs switching between the plurality of distribution systems if the distribution destination not able to communicate with the one of the plurality of distribution systems is important.

On the other hand, another multipoint distribution system according to the present invention may sum importance levels of distribution destinations not able to communicate with the current-use video distribution system and perform switching from the current-use video distribution system to the backup video distribution system if the sum of the importance levels exceeds a certain threshold.

Specifically, another multipoint distribution system according to the present invention includes a plurality of distribution systems and a management apparatus configured to control switching between the plurality of distribution systems to distribute content, wherein the management apparatus includes an importance level database configured to store importance levels of distribution destinations of content and checks importance levels of the distribution destinations by referring to the importance level database and perform switching between the plurality of distribution systems if a sum of importance levels of the distribution destinations not able to communicate with one of the plurality of distribution system that currently distributes content exceeds a predetermined threshold.

Another distribution method according to the present invention is a distribution method for a multipoint distribution system including a plurality of distribution systems and a management apparatus configured to control switching between the plurality of distribution systems to distribute content, the management apparatus including an importance level database configured to store importance levels of distribution destinations of content, the distribution method including checking, by the management apparatus, importance levels of the distribution destinations by referring to the importance level database and performing, by the management apparatus, switching between the plurality of distribution systems if a sum of importance levels of the distribution destinations not able to communicate with one of the plurality of distribution systems that currently distributes content exceeds a predetermined threshold.

Another management apparatus according to the present invention is a management apparatus for controlling switching between a plurality of distribution systems to distribute content in a multipoint distribution system including the plurality of distribution systems, the management apparatus including an importance level database configured to store importance levels of distribution destinations of content, wherein the management apparatus checks importance levels of the distribution destinations by referring to the importance level database and performs switching between the plurality of distribution systems if a sum of importance levels of the distribution destinations not able to communicate with the one of the plurality of distribution systems that currently distributes content exceeds a predetermined threshold.

The program according to the present invention is a program causing a computer to function as the management apparatus. The management apparatus can be realized by a computer and a program and the program can be recorded on a recording medium or provided through a network.

Effects of the Invention

According to the present invention, it is possible to prevent distribution to an important distribution destination from also being cut off in order to restore interrupted distribution to an unimportant distribution destination. Thus, the present invention can provide a multipoint distribution system, a distribution method, a management apparatus, and a program which determine whether or not to switch between the current-use system and the backup system in consideration of the importance levels of distribution destinations.

DESCRIPTION OF EMBODIMENTS

Hereinafter, embodiments of the present invention will be described with reference to the drawings. The embodiment described below is an example of the present invention, and the present invention is not limited to the following embodiment. In this specification and the drawings, constituent elements having the same reference signs are assumed to be the same.

First Embodiment

Figure 6:
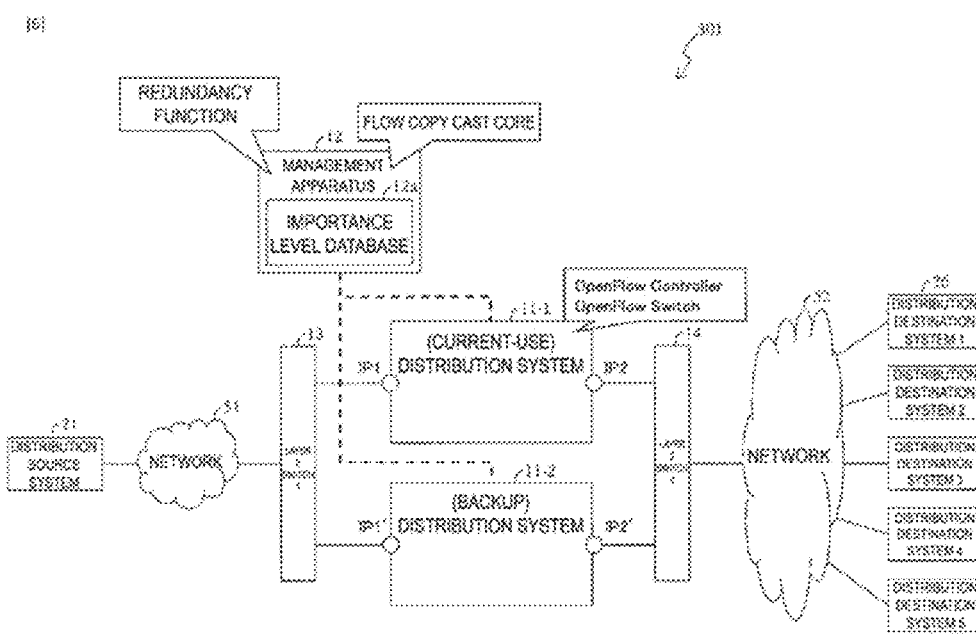
FIG. 6 is a diagram illustrating a multipoint distribution system according to the present invention.

FIG. 6 is a diagram illustrating a multipoint distribution system 301 of the present embodiment. The multipoint distribution system 301 includes a plurality of distribution systems (11-1, 11-2) and a management apparatus 12 configured to control switching between the distribution systems to distribute content, wherein the management apparatus 12 includes an importance level database 12a configured to store importance levels of distribution destinations of content and is configured to check an importance of a distribution destination 26 not able to communicate with a distribution system (11-1 or 11-2) that currently distributes content by referring to the importance level database 12a upon detecting the distribution destination not able to communicate with the distribution system and perform switching between the distribution systems (from 11-1 to 11-2 or from 11-2 to 11-1) if the distribution destination is important.

Figure 1:
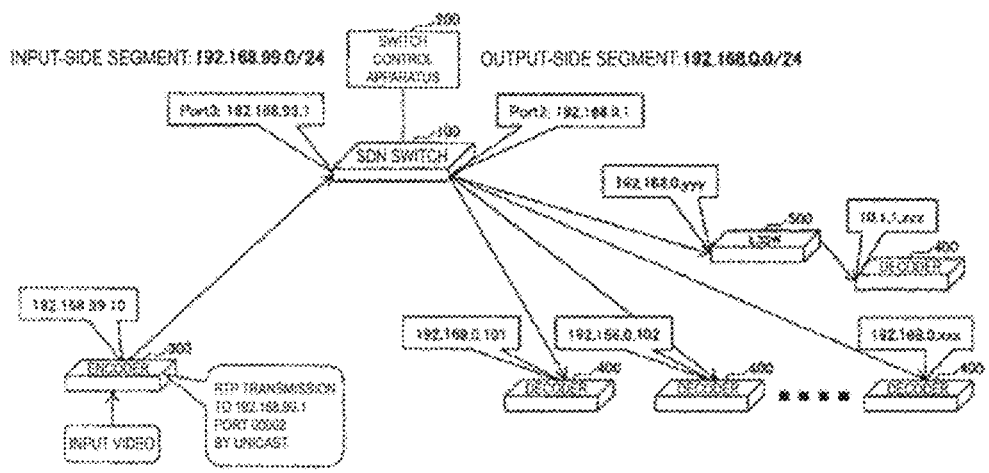
FIG. 1 is a diagram illustrating a related communication system.
Figure 2:
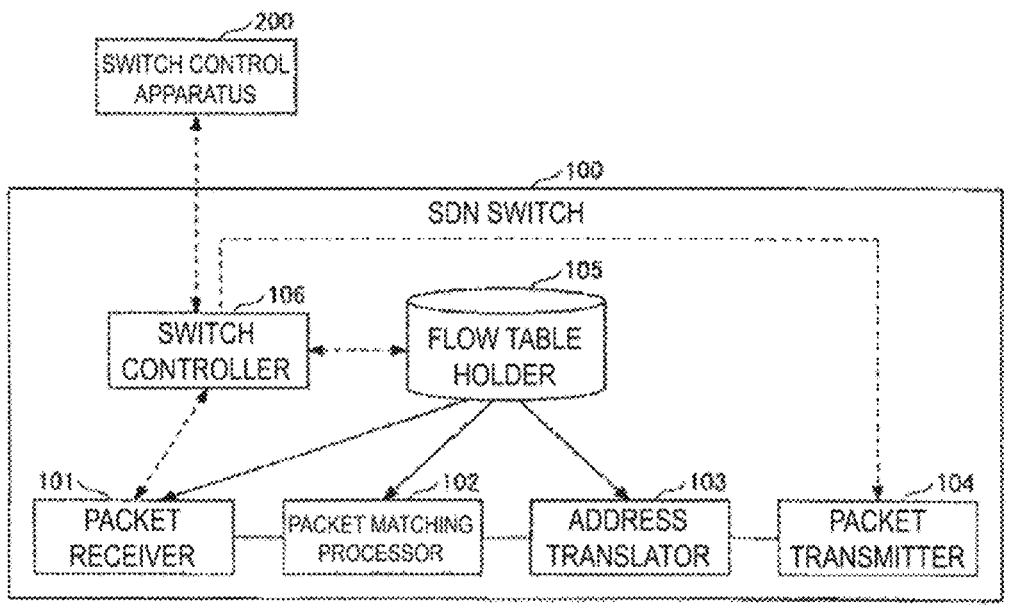
FIG. 2 is a diagram illustrating the related communication system.
Figure 3:
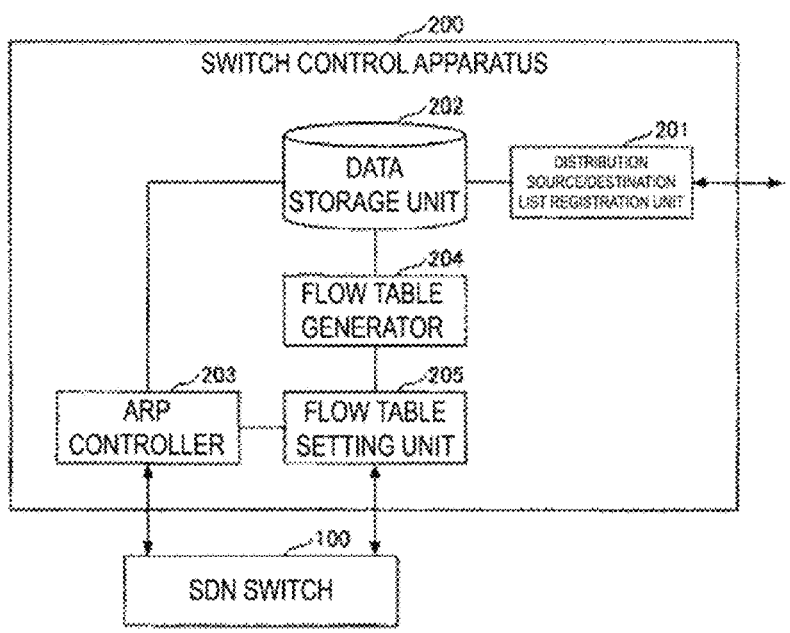
FIG. 3 is a diagram illustrating the related communication system.
Figure 4:
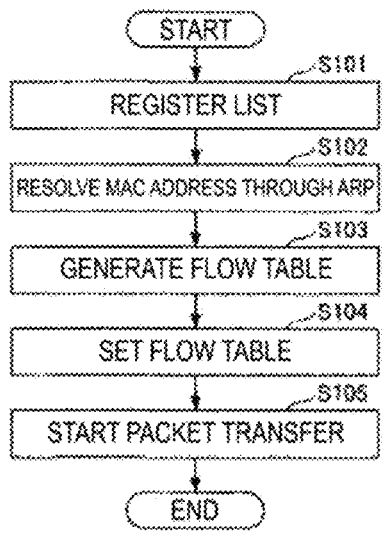
FIG. 4 is a diagram illustrating the related communication system.
Figure 5:
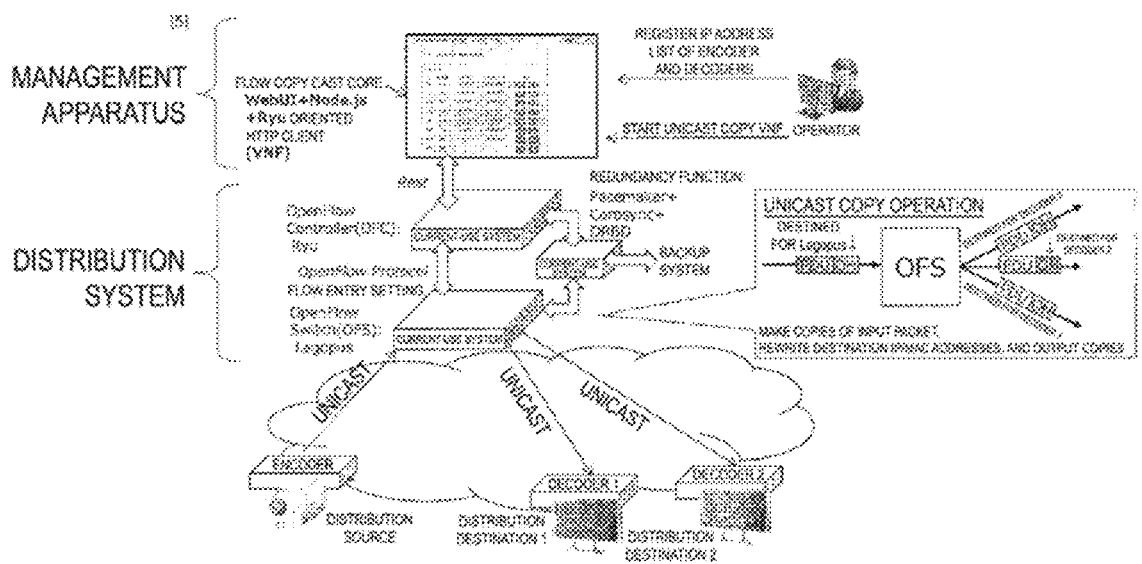
FIG. 5 is a diagram illustrating a specific example of the related communication system.

The distribution systems (11-1, 11-2) correspond to, for example, the SDN switch 100 described with reference to FIGS. 1 to 4 or the OpenFlow controller (OFC) and the OpenFlow switch (OFS) of the flow copy cast system described with reference to FIG. 5. The management apparatus 12 corresponds to, for example, the switch control apparatus 200 described with reference to FIGS. 1 to 4 or the flow copy cast core described with reference to FIG. 5.

Figures 7, 8:
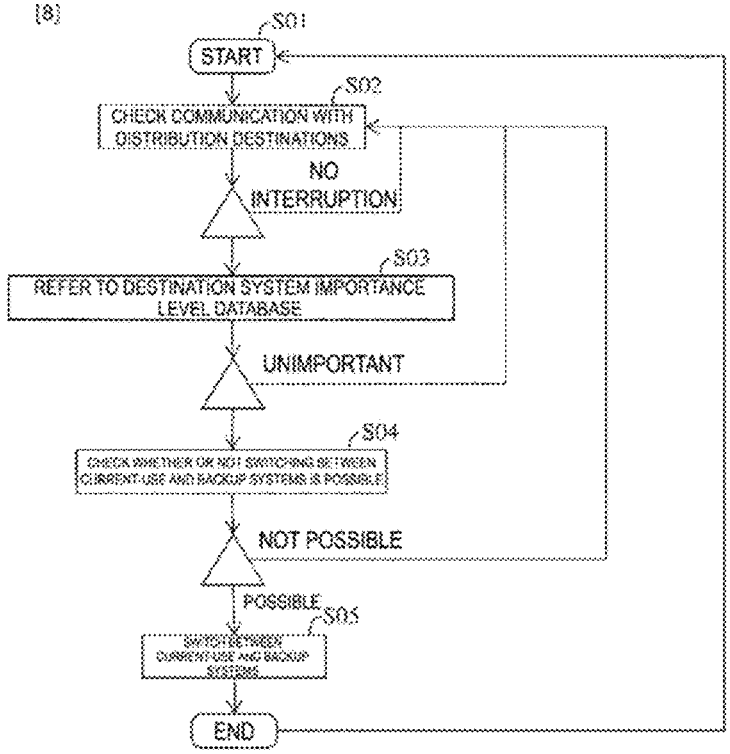
FIG. 7 is a diagram illustrating an example of an importance level database included in the multipoint distribution system according to the present invention.
FIG. 8 is a diagram illustrating a content distribution method performed by the multipoint distribution system according to the present invention.

The management apparatus 12 includes the importance level database 12a that stores the importance levels of the distribution destinations of content in addition to the functions of the switch control apparatus 200 described with reference to FIGS. 1 to 4 or the functions of the flow copy cast core described with reference to FIG. 5. FIG. 7 illustrates an example of the importance level database 12a. The importance level is set for each distribution destination system 26. The importance level in the present embodiment is a binary value indicating whether the system is important or not. For example, an administrator (operator) may set the importance level database 12a.

FIG. 8 is a diagram illustrating a content distribution method performed by the multipoint distribution system 301. First, in step S01, the multipoint distribution system 301 causes a layer 2 switch 13 to distribute a UDP video data packet, which has been sent by unicast from a video encoder side (the distribution source system 21) via a network 51, to the distribution system 11-1, such that the distribution system 11-1 receives the packet through a port IP1. Then, the distribution system 11-1 duplicates packets toward a designated video decoder group (group of distribution destination systems 26), changes their destination IP/MAC addresses, and sends them through a port IP2. The duplicated packets are delivered to distribution systems 26 which are the destinations via a layer 2 switch 14 and a network 52.

Figures 9, 10:
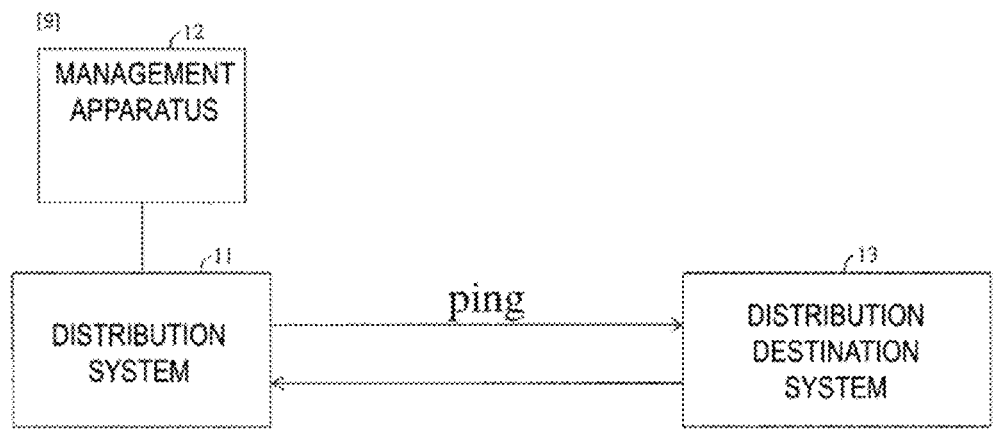
FIG. 9 is a diagram illustrating communication checking performed by the multipoint distribution system according to the present invention.
FIG. 10 is a diagram illustrating an example of an importance level database included in the multipoint distribution system according to the present invention.

In step S02, the distribution system 11-1 checks communication with each distribution destination system 26 at regular intervals. Specifically, the distribution system 11-1 generates a control signal for communication checking (for example, a ping) and transmits it to the distribution systems 26 which are the destinations via the layer 2 switch 14 and the network 52 as illustrated in FIG. 9. The distribution system 11-1 receives a reply to the control signal from each distribution destination system 26 through the port IP2 via the network 52 and the layer 2 switch 14. The distribution system 11-1 repeats step S02 if communication with all distribution destination systems 26 can be confirmed. On the other hand, the distribution system 11-1 performs step S03 when communication with at least one of the distribution destination systems 26 cannot be confirmed.

In step S03, the distribution system 11-1 refers to the importance level database 12a of the management apparatus 12 and determines whether or not a distribution destination system with which communication cannot be confirmed is an important distribution destination. Here, if the distribution destination system with which communication cannot be confirmed is an unimportant distribution destination, the management apparatus 12 does not issue an instruction to switch to a backup distribution system 11-2 and the distribution system 11-1 continues receiving a UDP video data packet from the distribution source system 21, duplicating packets, changing their destination IP/MAC addresses, and transmitting them to the group of distribution systems 26. On the other hand, if the distribution destination system with which communication cannot be confirmed is an important distribution destination, the management apparatus 12 performs step S04.

In step S04, the management apparatus 12 exchanges with each distribution system 11 a control signal for checking the state of each distribution system (particularly, whether or not it is possible to switch to the backup distribution system 11-2). If it is not possible to switch to the distribution system 11-2, the process repeats from step S02. That is, because it is not possible to switch to the backup distribution system 11-2 (it is not possible to distribute the UDP video data packet to all distribution destination systems 26), the multipoint distribution system 301 allows the current distribution system 11-1 to continue distribution even if the UDP video data packet cannot be distributed to some important distribution destinations. On the other hand, if it is possible to switch to the distribution system 11-2, the management apparatus 12 performs step S05.

In step S05, the management apparatus 12 switches the distribution of the UDP video data packet from the distribution system 11-1 to the backup distribution system 11-2. Through this step, the multipoint distribution system 301 causes the layer 2 switch 13 to distribute a UDP video data packet, which has been sent by unicast from the video encoder side (the distribution source system 21) via the network 51, to the distribution system 11-2, such that the distribution system 11-2 receives the packet through a port IP1'. Then, the distribution system 11-2 duplicates packets toward the designated video decoder group (group of distribution destination systems 26), changes their destination IP/MAC addresses, and sends them through a port IP2'. The duplicated packets are delivered to distribution systems 26 which are the destinations via the layer 2 switch 14 and the network 52.

By running the multipoint distribution system 301 as described above, it is possible to prevent distribution to an important distribution destination from also being cut off in order to restore interrupted distribution to an unimportant distribution destination.

Second Embodiment

A multipoint distribution system 302 of the present embodiment has the same structure as the multipoint distribution system 301 described with reference to FIG. 6 with the difference being the determination method for switching the distribution system 11. The multipoint distribution system 302 includes a plurality of distribution systems (11-1, 11-2) and a management apparatus 12 configured to control switching between the distribution systems to distribute content, wherein the management apparatus 12 includes an importance level database 12a configured to store importance levels of distribution destinations of content and is configured to check importance levels of distribution destinations by referring to the importance level database 12a and perform switching between the distribution systems (from 11-1 to 11-2 or from 11-2 to 11-1) if a sum of importance levels of distribution destinations not able to communicate with a distribution system (11-1 or 11-2) that currently distributes content exceeds a predetermined threshold. In the present embodiment, only parts different from the multipoint distribution system 301 of FIG. 6 will be described.

In the importance level database 12a of the management apparatus 12 of the multipoint distribution system 302, the importance level is also set for each distribution destination system 26, but the importance level of the present embodiment is multivalued. FIG. 10 illustrates an example of the importance level database 12a of the present embodiment.

Figure 11:
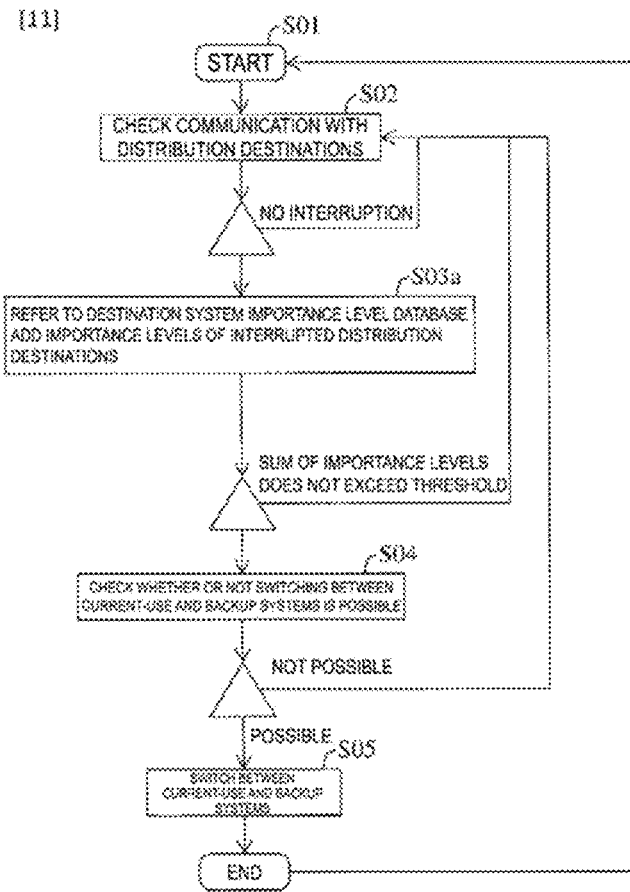
FIG. 11 is a diagram illustrating a content distribution method performed by the multipoint distribution system according to the present invention.

FIG. 11 is a diagram illustrating a content distribution method performed by the multipoint distribution system 302. The difference from the content distribution method performed by the multipoint distribution system 301 described with reference to FIG. 8 is step S03a. In step S03a, the distribution system 11-1 refers to the importance level database 12a of the management apparatus 12, adds the importance levels of all distribution destination systems with which communication cannot be confirmed, and compares the sum of the importance levels with a preset threshold. Here, if the sum of the importance levels does not exceed the threshold, the management apparatus 12 does not issue an instruction to switch to a backup distribution system 11-2 and the distribution system 11-1 continues receiving a UDP video data packet from the distribution source system 21, duplicating packets, changing their destination IP/MAC addresses, and transmitting them to the group of distribution systems 26. On the other hand, if the sum of the importance levels exceeds the threshold, the management apparatus 12 performs step S04.

Differences of the multipoint distribution system 302 from the multipoint distribution system 301 of FIG. 6 are content described in the importance level database 12a and the operation of step S03a as described above. These differences allow the multipoint distribution system 302 to perform switching determination based on an overall importance level of systems when preventing distribution to an important distribution destination from also being cut off in order to restore interrupted distribution to unimportant distribution destinations.

Other Embodiments

The above embodiments have been described with reference to the case where the importance level database 12a is included in the management apparatus 12, but the location of the importance level database 12a is not limited to the management apparatus 12. The importance level database 12a may be provided as a separate device or may be included in each distribution system 11.

Further, in the multipoint distribution system, each distribution system may autonomously check communication with distribution destination systems, query the importance level database for importance levels, and determine distribution system switching, or alternatively, the management apparatus may serve as a central control apparatus and control the distribution systems such that they check communication and output a switching instruction to each distribution system based on importance levels in the importance level database. In the latter case, the management apparatus can also be realized by a computer and a program and the program can be recorded on a recording medium or provided through a network.

Appendix

The crux of the present invention is that a current-use distribution system is checked when communication with a distribution destination having a high importance level is interrupted (or when an overall importance level exceeds a threshold), and it is determined whether to switch to a backup distribution system if the checked result is that the current-use distribution system is abnormal. Determination in this way not only prevents distribution to an important distribution destination from also being cut off in order to restore interrupted distribution to unimportant distribution destinations but also makes it possible to determine whether to perform switching between distribution systems such that the effects of distribution interruption are minimized (risks are minimized at the time of failure) in consideration of total effects of distribution interruption. That is, if distribution to an important distribution destination is underway even when distribution of some other important distribution destinations has been interrupted, the multipoint distribution system according to the present invention can determine whether or not to switch distribution systems (may sometimes determine not to switch distribution systems) taking into consideration the total effects. As described above, the present invention is completely different from the technology described in Non Patent Literature 1 in which a communication band is assigned to a packet having high priority.

11, 11-1, 11-2 Distribution system
12 Management apparatus
12a Importance level database
13, 14 Layer 2 switch
21 Distribution source system
26 Distribution destination system
51, 52 Network
100 SDN switch
102 Packet matching processor
103 Address translator
104 Packet transmitter
105 Flow table holder
106 Switch controller
200 Switch control apparatus
201 Distribution source/destination list registration unit
202 Data storage unit
203 ARP controller
204 Flow table generator
205 Flow table setting unit
250 Signal format checker
300 Encoder
301, 302 Multipoint distribution system
400 Decoder
500 L3SW

The invention claimed is:

1. A multipoint distribution system comprising:
a plurality of distribution systems; and
a management apparatus configured to control switching between the plurality of distribution systems to distribute content,
wherein the management apparatus includes an importance level database configured to store importance levels of distribution destinations of content and checks importance levels of the distribution destinations by referring to the importance level database and perform switching between the plurality of distribution systems if a sum of importance levels of the distribution destinations not able to communicate with one of the plurality of distribution systems that currently distributes content exceeds a predetermined threshold.

2. A distribution method for a multipoint distribution system including a plurality of distribution systems and a management apparatus configured to control switching between the plurality of distribution systems to distribute content,
the management apparatus including an importance level database configured to store importance levels of distribution destinations of content,
the distribution method comprising checking, by the management apparatus, importance levels of the distribution destinations by referring to the importance level database and performing, by the management apparatus, switching between the plurality of distribution systems if a sum of importance levels of the distribution destinations not able to communicate with one of the plurality of distribution systems that currently distributes content exceeds a predetermined threshold.

3. A management apparatus for controlling switching between a plurality of distribution systems to distribute content in a multipoint distribution system including the plurality of distribution systems, the management apparatus comprising an importance level database configured to store importance levels of distribution destinations of content,
wherein the management apparatus checks importance levels of the distribution destinations by referring to the importance level database and performs switching between the plurality of distribution systems if a sum of importance levels of the distribution destinations not able to communicate with the one of the plurality of distribution systems that currently distributes content exceeds a predetermined threshold.

4. A non-transitory computer-readable medium having computer-executable instructions stored thereon that, upon execution of the computer-executable instructions by a processor of a computer, cause the computer to function as the management apparatus according to claim 3.

* * * * *